United States Patent
Chen et al.

(10) Patent No.: US 11,233,944 B2
(45) Date of Patent: Jan. 25, 2022

(54) METHOD FOR ACHIEVING BULLET TIME CAPTURING EFFECT AND PANORAMIC CAMERA

(71) Applicant: ARASHI VISION INC., Shenzhen (CN)

(72) Inventors: Cong Chen, Shenzhen (CN); Wenjie Jiang, Shenzhen (CN); Jingkang Liu, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 0 days.

(21) Appl. No.: 16/764,366

(22) PCT Filed: Nov. 2, 2018

(86) PCT No.: PCT/CN2018/113720
§ 371 (c)(1),
(2) Date: May 14, 2020

(87) PCT Pub. No.: WO2019/096016
PCT Pub. Date: May 23, 2019

(65) Prior Publication Data
US 2020/0280685 A1    Sep. 3, 2020

(30) Foreign Application Priority Data

Nov. 14, 2017 (CN) .......................... 201711123367.2

(51) Int. Cl.
*H04N 5/232* (2006.01)
*H04N 5/262* (2006.01)

(52) U.S. Cl.
CPC ....... *H04N 5/23267* (2013.01); *H04N 5/2327* (2013.01); *H04N 5/23238* (2013.01);
(Continued)

(58) Field of Classification Search
CPC ........... H04N 5/23238; H04N 5/23264; G03B 37/00; G03B 37/02; G02B 13/06
See application file for complete search history.

(56) References Cited

U.S. PATENT DOCUMENTS 10,447,926 B1 * 10/2019 Brailovskiy ....... H04N 5/23238
2004/0183898 A1 * 9/2004 Endo .................. H04N 5/23238
348/36
(Continued)

FOREIGN PATENT DOCUMENTS

| CN | 105262958 A | 1/2016 |
| CN | 105681656 A | 6/2016 |

(Continued)

OTHER PUBLICATIONS

EPO, Machine Translation of CN 10708154 A (Year: 2020).*
(Continued)

*Primary Examiner* — David N Werner
(74) *Attorney, Agent, or Firm* — Cheng-Ju Chiang

(57) ABSTRACT

Provided in the present invention are a method for achieving a bullet time capturing effect and a panoramic camera. The method comprises: acquiring a panoramic video captured when a panoramic camera rotates around a capture target; acquiring from within the panoramic video hemispherical images close to the side of the capture target; splicing the hemispherical images to generate a spliced image; and fixing a viewpoint of the spliced image, thus achieving a bullet time capturing effect. According to the present invention, only one panoramic camera is needed to be able to capture the bullet time capturing effect, so that the capturing cost of the bullet time capturing effect in the present invention is low. Meanwhile, since the bullet time capturing effect is obtained by means of a panoramic video being captured when a panoramic camera rotates around a capture target (Continued)

and processing being carried out on the panoramic video, the precision is high.

17 Claims, 1 Drawing Sheet

(52) U.S. Cl.
CPC ..... *H04N 5/23264* (2013.01); *H04N 5/23274* (2013.01); *H04N 5/23277* (2013.01); *H04N 5/2627* (2013.01)

(56) References Cited

U.S. PATENT DOCUMENTS

| | | | | |
|---|---|---|---|---|
| 2007/0036460 | A1* | 2/2007 | Koch | H04N 5/23264 382/276 |
| 2010/0085442 | A1* | 4/2010 | Yamashita | H04N 5/23238 348/222.1 |
| 2010/0302347 | A1* | 12/2010 | Shikata | H04N 5/23238 348/36 |
| 2012/0105578 | A1* | 5/2012 | Ohmiya | G06T 7/73 348/36 |
| 2012/0194636 | A1* | 8/2012 | Tokunaga | H04N 5/23238 348/36 |
| 2016/0073022 | A1* | 3/2016 | Kimura | H04N 5/232939 348/36 |
| 2016/0080647 | A1* | 3/2016 | Kimura | H04N 5/772 348/36 |
| 2016/0301870 | A1* | 10/2016 | Matsuoka | H04N 5/23254 |
| 2016/0323561 | A1* | 11/2016 | Jin | H04N 5/772 |
| 2017/0026574 | A1* | 1/2017 | Kwon | H04N 5/232935 |
| 2017/0163881 | A1* | 6/2017 | Oshima | H04N 5/23206 |
| 2017/0177980 | A1* | 6/2017 | Alibay | H04N 5/23254 |
| 2017/0323458 | A1* | 11/2017 | Lablans | G06K 9/00 |
| 2018/0359415 | A1* | 12/2018 | Liang | H04N 5/23254 |
| 2018/0359419 | A1* | 12/2018 | Hu | G03B 15/006 |
| 2018/0367733 | A1* | 12/2018 | Sun | H04N 5/23258 |
| 2019/0158813 | A1* | 5/2019 | Rowell | H04N 13/189 |
| 2019/0182428 | A1* | 6/2019 | Huang | H04N 5/144 |

FOREIGN PATENT DOCUMENTS

| | | |
|---|---|---|
| CN | 106550229 A | 3/2017 |
| CN | 107071279 A | 8/2017 |
| CN | 107087154 A | 8/2017 |
| CN | 107147895 A | 9/2017 |

OTHER PUBLICATIONS

EPO, Machine Translation of CN 107147895 A (Year: 2020).*
"FTV (free-viewpoint television)", 1-4 APSIPA Trans. on Signal & Information Processing (online) (2012) (Year: 2012).*
Insta360, "How to Shoot Bullet-Time Shots with the Insta360 ONE", Insta360.com (archived version from Aug. 28, 2017) (Year: 2017).*

* cited by examiner

METHOD FOR ACHIEVING BULLET TIME CAPTURING EFFECT AND PANORAMIC CAMERA

CROSS REFERENCE TO RELATED APPLICATIONS

The present application is a 35 U.S.C. § 371 National Phase conversion of International (PCT) Patent Application No. PCT/CN2018/113720, filed on Nov. 2, 2018, which claims priority of Chinese Patent Application No. 201711123367.2, filed on Nov. 14, 2017, the disclosure of which is incorporated by reference herein. The PCT International Patent Application was filed and published in Chinese.

FIELD OF THE INVENTION

The present invention relates generally to the field of image processing, and more specifically to a method for achieving bullet time effect and a panoramic camera.

BACKGROUND OF THE INVENTION

Bullet time is used in films, TV advertisements, or computer games to simulate variable-speed special effects with computer-aided photography, such as enhanced slow-motion, time-frozen effects and other effects. The bullet time effect was originally achieved photographically by a set of still cameras (not a video camera) surrounding the subject. The cameras are fired sequentially, or all at the same time. Single frames from each camera are combined consecutively to produce a visual rotation effect on a stationary object, or as hyper-slow-motion. In theory, this technique suggests the limitless perspectives and variable frame rates possible with a virtual camera. However, if the still array process is done with real cameras, it is often limited to assigned paths. The bullet time is characterized both by its extreme transformation of time and space: by way of the ability of the camera angle (the audience's point-of-view) to move around the scene at a normal speed while events are slowed. Bullet time is widely used in film and television, advertising, MV, creative activities and other fields. However, the visual effect of bullet time seems gorgeous, but it is more cumbersome to produce. Traditional cameras can't keep the shooting angle to view the target object while moving at a high speed. Therefore, to achieve the bullet time shooting effect, multiple cameras must be placed in the shooting path in advance. By controlling the camera's exposure sequence, the shooting frame sequence, after post combination, to achieve the shooting effect of bullet time. The existing system for realizing the bullet-time effect, due to the large number of cameras and the inaccurate control, causes the shooting progress to be slow, cannot meet the shooting needs, and is expensive and the shooting cost is high.

SUMMARY OF THE INVENTION

Technical Problem

The object of the present invention is to provide a method for achieving bullet time effect, computer-readable storage medium and a panoramic camera, aiming to solve the problem that the existing system, due to the large number of cameras and the inaccurate control, causes the shooting progress to be slow, cannot meet the shooting needs, and is expensive and the shooting cost is high.

Technical Solution

According to a first aspect, the present invention provides a method for achieving bullet time effect, comprises steps of:
acquiring a panoramic video captured when a panoramic camera rotates around a shooting object;
obtaining hemisphere images close to the shooting object side from the panoramic video;
stitching the hemisphere images to generate a stitched image; and
fixing a viewpoint of the stitched image to achieve a bullet time effect.

According to a second aspect, the present invention provides a computer-readable medium that stores a computer program, the computer program is to be executed by a processor to perform steps of the method for achieving bullet time effect described above.

According to a third aspect, the present invention provides a panoramic camera, comprising: one or more processors, a memory connected to the one or more processors, and one or more computer programs, where the one or more computer programs are stored in the memory and are configured to be executed by the one or more processors to perform steps of the method for achieving bullet time effect described above.

Advantages

In the present invention, by means of acquiring a panoramic video captured when a panoramic camera rotates around a shooting object, obtaining hemisphere images close to the shooting object side from the panoramic video, stitching the hemisphere images to generate a stitched image, and fixing a viewpoint of the stitched image, thus achieving a bullet time effect; that is, only one panoramic camera is needed to be able to capture the bullet time effect, therefore, the capturing cost of a bullet time effect in the present invention is low. Meanwhile, since a bullet time effect is obtained by means of a panoramic video being captured when a panoramic camera rotates around a shooting object and being processed, the precision is high.

DETAILED DESCRIPTION OF THE INVENTION

The foregoing objects, technical solution and advantages of the invention will be much clearer from the following detail description taken with the accompanying drawings and embodiments. It should be understood that the specific embodiments described herein are only used to explain the present invention and are not intended to limit the present invention.

In order to explain the technical solution of the present invention, the following will be described by specific embodiments.

First Embodiment

Figure 1:
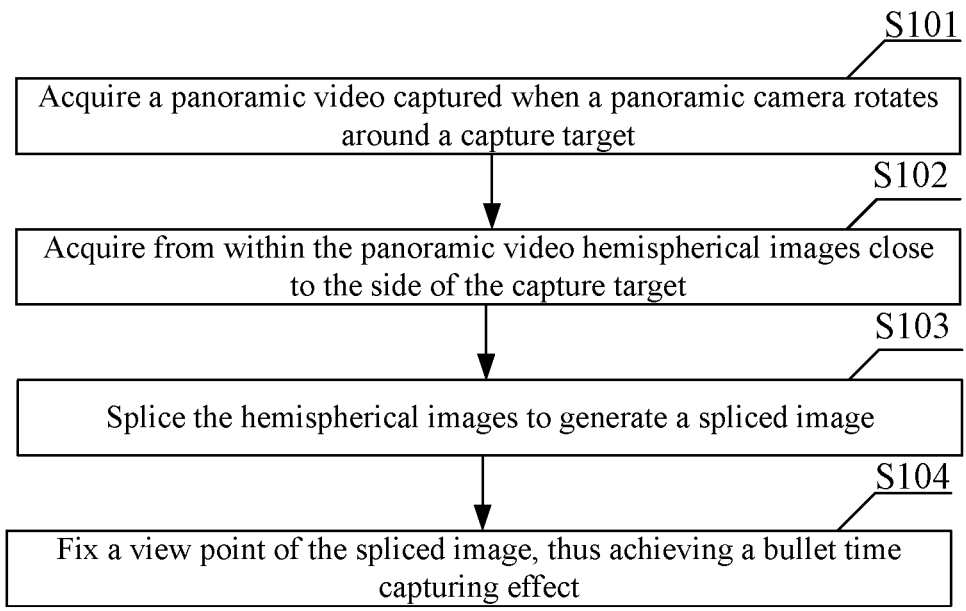
FIG. 1 is a flow diagram of a method for achieving bullet time effect in accordance with a first embodiment of the present invention.

Referring to FIG. 1, a method for achieving bullet time effect in accordance with the first embodiment of the present invention comprises the following steps. It should be noted that if there are substantially the same results, the method for achieving bullet time effect of the present invention is not limited to the sequence of the flow shown in FIG. 1.

S101, acquiring a panoramic video captured when a panoramic camera rotates around a shooting object.

In the first embodiment of the present invention, when the shooting object is a photographer, the panoramic video captured when a panoramic camera rotates around the shooting object, may specifically be captured in the following manner that:

the photographer swings an auxiliary line or a selfie stick connected to the panoramic camera above the head to rotate the panoramic camera around the photographer, and simultaneously captures the motion status of objects and/or people on the photographer's side.

In order to achieve the best bullet time shooting effect, it is best to keep the panoramic camera rotating on a horizontal plane perpendicular to the photographer's body when swinging the selfie stick or auxiliary line.

S102, obtaining hemisphere images close to the shooting object side from the panoramic video.

In accordance with the first embodiment of the present invention, S102 can be:

adjusting the start and end coordinates of the sampled image in a register of the camera sensor so that a sampling range of the sampled image is a hemisphere close to of the shooting object side.

S103, stitching the hemisphere images to generate a stitched image.

In accordance with the first embodiment of the present invention, after S103, the method may further include a step of:

performing anti-shake processing on the stitched image, and keeping the coordinate system of the shooting area in the same direction as the earth coordinate system.

S104, fixing a viewpoint of the stitched image to achieve a bullet time effect.

In accordance with the first embodiment of the present invention, S104 can be:

fixing the viewpoint of the stitched image to the direction of the shooting object, and shooting the object area.

In normal anti-shake mode, the change of viewpoint is that V rotates around the z-axis to the equal-longitude position $V_0$ of V', where the rotation matrix is $R_0$; rotate $V_0$ to V on the equal-longitude line, where the rotation matrix is $R_1$; in order to ensure that the original viewpoint remains unchanged after anti-shake processing, the direction of the viewfinder image is in accordance with human habits, and anti-shake at the same time, it is necessary to reverse the direction of the viewpoint V', and the final anti-shake transformation matrix is $R_2=R_0 \times R_1 \times R$; where V is the vector of the center of the viewpoint and the center of the stitched image in the earth coordinate system, $V=(0, 0, -1)$, V' is the vector after anti-shake processing of the stitched image, $V'=(x',y',z')$, $V'=R*V$ R is the original rotation matrix calculated by the anti-shake algorithm, $R_0=\exp(\phi[k_0]_x)$, $R_1=\exp(\theta[k_1]_x)$, $k_0=(0, 0, 1)^T$ for the z-axis direction, $k_1=(-\sin(\phi), \cos(\phi), 0)^T$ for the longitude being an equal-longitude rotation axis, $\phi=\text{at an } 2(y', x')$ for the longitude direction, $\theta=\text{at an } 2(z', \sqrt{x'^2+y'^2})$ for the latitude direction.

Second Embodiment

In accordance with a second embodiment, the present invention provides a computer-readable medium that stores a computer program, the computer program is to be executed by a processor to perform steps of the method for achieving bullet time effect provided in the first embodiment of the present invention.

Third Embodiment

Figure 2:
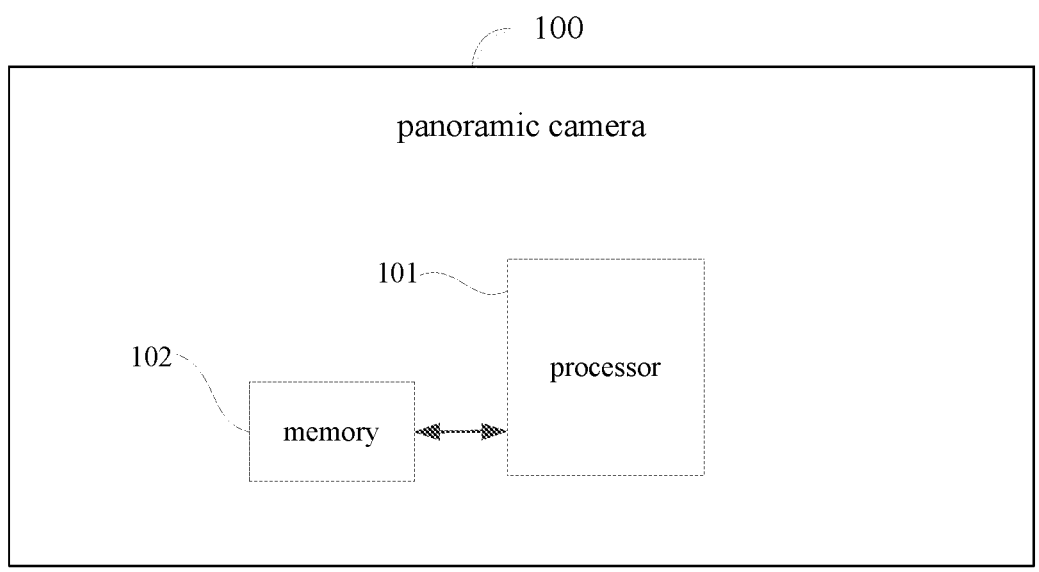
FIG. 2 is a schematic diagram of a panoramic camera in accordance with a is third embodiment of the present invention.

FIG. 2 shows a block diagram of a panoramic camera 100 provided in the third embodiment of the present invention. A panoramic camera 100 comprises: one or more processors 101, a memory 102 connected to the one or more processors 101, and one or more computer programs, where the one or more computer programs are stored in the memory 102 and are configured to be executed by the one or more processors 101 to perform steps of the method for achieving bullet time effect provided in the first embodiment of the present invention.

In the present invention, by means of acquiring a panoramic video captured when a panoramic camera rotates around a shooting object, obtaining hemisphere images close to the shooting object side from the panoramic video, stitching the hemisphere images to generate a stitched image, and fixing a viewpoint of the stitched image, thus achieving a bullet time effect; that is, only one panoramic camera is needed to be able to capture the bullet time effect, therefore, the capturing cost of a bullet time effect in the present invention is low. Meanwhile, since a bullet time effect is obtained by means of a panoramic video being captured when a panoramic camera rotates around a shooting object and being processed, the precision is high.

A person of ordinary skill in the art may understand that all or part of the steps in the method of the above embodiments can be completed by instructing relevant hardware through a program or programs. The program or programs can be stored in a computer-readable storage medium, and the storage media can be, ROM (ROM, Read Only Memory), RAM (RAM, Random Access Memory), magnetic disk, optical disk, etc.

The above are only preferred embodiments of the present invention and are not intended to limit the present invention. Any modification, equivalents replacements and improvements made within the spirit and principle of the present invention should be included within the scope of the present invention.

What is claimed is:

1. A method for achieving bullet time effect, comprising steps of:

acquiring a panoramic video captured when a panoramic camera rotates around a shooting object;

obtaining hemisphere images close to the shooting object side from the panoramic video;

stitching the hemisphere images to generate a stitched image; and fixing a viewpoint of the stitched image to achieve a bullet time effect, comprising:

in a normal anti-shake mode, a change of the viewpoint being that V rotates around the z-axis to an equal-longitude position $V_0$ of V', where a rotation matrix is $R_0$; rotating $V_0$ to V' on an equal-longitude line, where a rotation matrix is $R_1$, and a final anti-shake transformation matrix is $R_2=R_0 \times R_1 \times R$; where V is the vector of a center of the viewpoint and a center of the stitched image in the earth coordinate system, $V=(0, 0, -1)$, V' is the vector after anti-shake processing of the stitched image, $V'=(x',y',z')$, $V'=R*V$, R is an original rotation matrix calculated by the anti-shake algorithm, $R_0=\exp(\phi[k_0]_x)$, $R_1=\exp(\phi[k_1]_x)$, $k_0=(0, 0, 1)^T$ for the z-axis direction, $k_1=(-\sin(\phi), \cos(\phi), 0)^T$ for the longitude being an equal-longitude rotation axis, $\phi=$at an $2(y', x')$ for the longitude direction, $\theta=$at an $2(z', \sqrt{x'^2+y'^2})$ for the latitude direction.

2. The method of claim 1, wherein when the shooting object is a photographer, the panoramic video captured when a panoramic camera rotates around the shooting object, specifically is captured in the following manner that:

the photographer swings an auxiliary line or a selfie stick connected to the panoramic camera above the photographer's head to rotate the panoramic camera around the photographer; and the photographer simultaneously captures the motion status of objects and/or people on the photographer's side.

3. The method of claim 2, wherein keeping the panoramic camera rotating on a horizontal plane perpendicular to the photographer's body when swinging the selfie stick or the auxiliary line.

4. The method of claim 1, wherein the step of obtaining hemisphere images close to the shooting object side from the panoramic video, comprises:

adjusting the start and end coordinates of a sampled image in a register of a camera sensor so that a sampling range of the sampled image is a hemisphere close to the shooting object side.

5. The method of claim 1, wherein after stitching the hemisphere images to generate a stitched image, the method further comprises:

performing anti-shake processing on the stitched image; and keeping the coordinate system of the shooting area in the same direction as the earth coordinate system.

6. The method of claim 1, wherein the step of fixing a viewpoint of the stitched image, comprises:

fixing the viewpoint of the stitched image to the direction of the shooting object; and framing the shooting object area.

7. A non-transitory computer-readable medium that stores a set of computer executive program instructions, wherein the set of computer executive program instructions are executed by one or more processors to perform a method for achieving bullet time effect, comprising steps of:

acquiring a panoramic video captured when a panoramic camera rotates around a shooting object;

obtaining hemisphere images close to the shooting object side from the panoramic video;

stitching the hemisphere images to generate a stitched image; and fixing a viewpoint of the stitched image to achieve a bullet time effect, comprising:

in a normal anti-shake mode, a change of the viewpoint being that V rotates around the z-axis to an equal-longitude position $V_0$ of V', where a rotation matrix is $R_0$; rotating $V_0$ to V' on an equal-longitude line, where a rotation matrix is $R_L$ and a final anti-shake transformation matrix is $R_2=R_0 \times R_1 \times R$; where V is the vector of a center of the viewpoint and a center of the stitched image in the earth coordinate system, $V=(0, 0, -1)$, V' is the vector after anti-shake processing of the stitched image, $V'=(x',y',z')$, $V'=R*V$, R is an original rotation matrix calculated by the anti-shake algorithm, $R_0=\exp(\phi[k_0]_x)$, $R_1=\exp(\theta[k_1]_x)$, $k_0=(0, 0, 1)^T$ for the z-axis direction, $k_1=(-\sin(\phi), \cos(\phi), 0)^T$ for the longitude being an equal-longitude rotation axis, $\phi=$at an $2(y', x')$ for the longitude direction, $\theta=$at an $2(z', \sqrt{x'^2+y'^2})$ for the latitude direction.

8. The computer-readable medium of claim 7, wherein after the step of stitching the hemisphere images to generate a stitched image, further comprising a step of:

performing anti-shake processing on the stitched image; and keeping the coordinate system of the shooting area in the same direction as the earth coordinate system.

9. The computer-readable medium of claim 7, wherein when the shooting object is a photographer, the panoramic video captured when a panoramic camera rotates around the shooting object, specifically is captured in the following manner that:

the photographer swings an auxiliary line or a selfie stick connected to the panoramic camera above the photographer's head to rotate the panoramic camera around the photographer, and simultaneously captures the motion status of objects and/or people on the photographer's side.

10. The computer-readable medium of claim 9, wherein keeping the panoramic camera rotating on a horizontal plane perpendicular to the photographer's body when swinging the selfie stick or the auxiliary line.

11. The computer-readable medium of claim 7, wherein the step of obtaining hemisphere images close to the shooting object side from the panoramic video, comprises:

adjusting the start and end coordinates of a sampled image in a register of a camera sensor so that a sampling range of the sampled image is a hemisphere close to the shooting object side.

12. The computer-readable medium of claim 7, wherein the step of fixing a viewpoint of the stitched image, comprises:

fixing the viewpoint of the stitched image to the direction of the shooting object; and framing the shooting object area.

13. A panoramic camera, comprising: one or more processors, a non-transitory, computer readable memory, and a set of computer-executable program instructions, wherein the set of computer-executable program instructions are stored in the memory and are configured to be executed by the one or more processors to perform steps of:

acquiring a panoramic video captured when a panoramic camera rotates around a shooting object;

obtaining hemisphere images close to the shooting object side from the panoramic video;

stitching the hemisphere images to generate a stitched image; and fixing a viewpoint of the stitched image to achieve a bullet time effect, comprising:

in a normal anti-shake mode, a change of the viewpoint being that V rotates around the z-axis to an equal-longitude position $V_0$ of V', where a rotation matrix is $R_0$; rotating $V_0$ to V' on an equal-longitude line, where a rotation matrix is $R_1$, and a final anti-shake transformation matrix is $R_2=R_0 \times R_1 \times R$; where V is the vector of a center of the viewpoint and a center of the stitched image in the earth coordinate system, $V=(0, 0, -1)$, V' is the vector after anti-shake processing of the stitched image, $V'=(x',y',z')$, $V'=R*V$, R is an original rotation matrix calculated by the anti-shake algorithm, $R_0=\exp(\phi[k_0]_x)$, $R_1=\exp(\theta[k_1]_x)$, $k_0=(0, 0, 1)^T$ for the z-axis direction, $k_1=(-\sin(\phi), \cos(\phi), 0)^T$ for the longitude being an equal-longitude rotation axis, $\phi=$at an $2(y', x')$ for the longitude direction, $\theta=$at an $2(z', \sqrt{x'^2+y'^2})$ for the latitude direction.

14. The panoramic camera of claim 13, wherein after the step of stitching the hemisphere images to generate a stitched image, further comprising a step of:
- performing anti-shake processing on the stitched image; and
- keeping the coordinate system of the shooting area in the same direction as the earth coordinate system.

15. The panoramic camera of claim 13, wherein when the shooting object is a photographer, the panoramic video captured when a panoramic camera rotates around the shooting object, is captured in the following manner that:
- the photographer swings an auxiliary line or a selfie stick connected to the panoramic camera above the photographer's head to rotate the panoramic camera around the photographer; and
- the photographer simultaneously captures the motion status of objects and/or people on the photographer's side;
- wherein keeping the panoramic camera rotating on a horizontal plane perpendicular to the photographer's body when swinging the selfie stick or the auxiliary line.

16. The panoramic camera of claim 13, wherein the step of obtaining hemisphere images close to the shooting object side from the panoramic video, comprises:
- adjusting the start and end coordinates of a sampled image in a register of a camera sensor so that a sampling range of the sampled image is a hemisphere close to the shooting object side.

17. The panoramic camera of claim 13, wherein the step of fixing a viewpoint of the stitched image, comprises:
- fixing the viewpoint of the stitched image to the direction of the shooting object; and
- framing the shooting object area.

* * * * *